Nov. 13, 1951 W. F. WOLFNER, II 2,575,203
FILM ADVANCING MECHANISM IN A
SOUND PICTURE STRIP PROJECTOR
Filed Feb. 14, 1947 3 Sheets-Sheet 1

INVENTOR
William F. Wolfner II
BY
ATTORNEY

Nov. 13, 1951  W. F. WOLFNER, II  2,575,203
FILM ADVANCING MECHANISM IN A
SOUND PICTURE STRIP PROJECTOR

Filed Feb. 14, 1947                                     3 Sheets-Sheet 2

INVENTOR
William F. Wolfner II
BY
Julius E. Foster
ATTORNEY

Nov. 13, 1951 W. F. WOLFNER, II 2,575,203
FILM ADVANCING MECHANISM IN A
SOUND PICTURE STRIP PROJECTOR
Filed Feb. 14, 1947 3 Sheets-Sheet 3
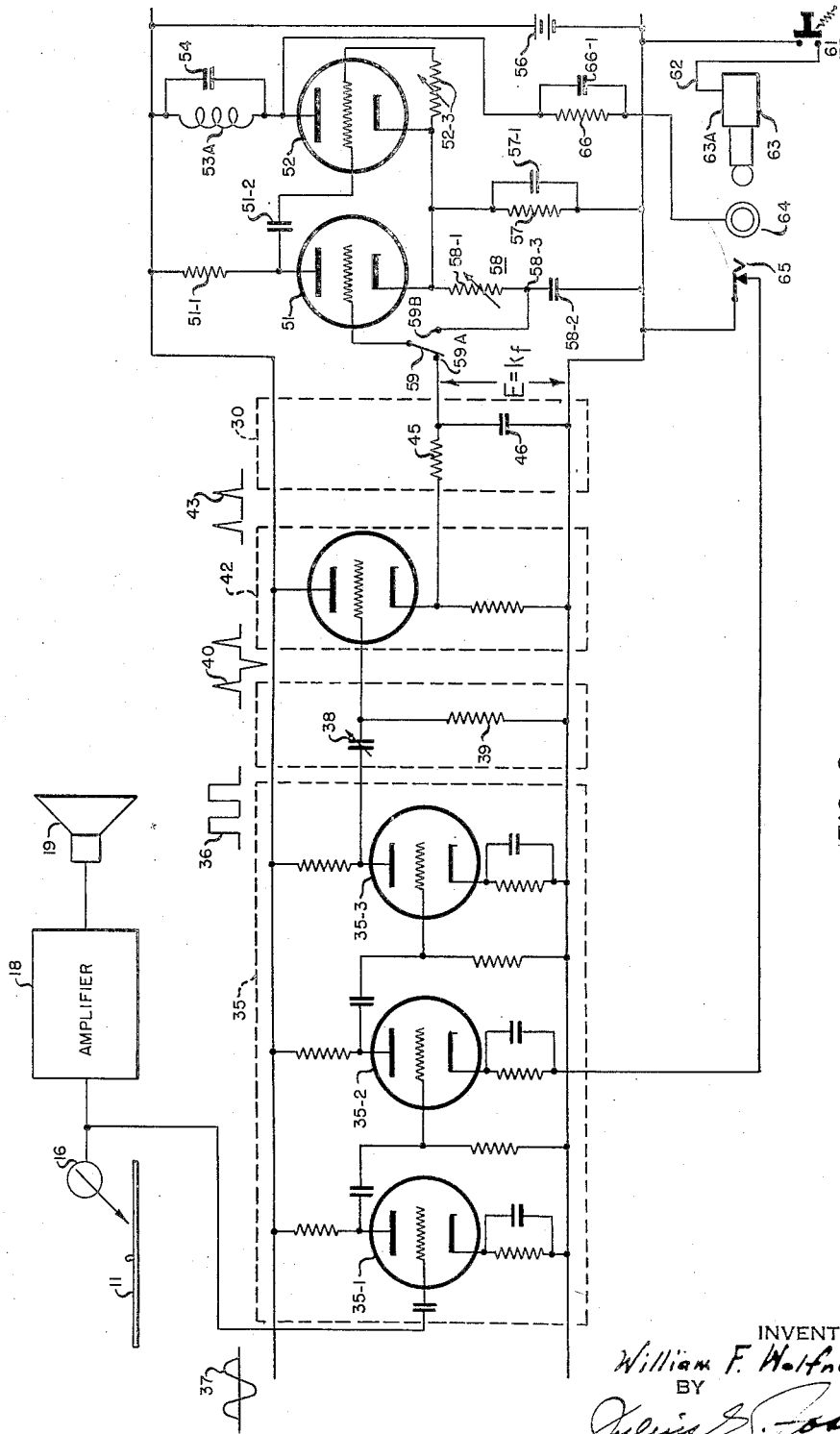
FIG. 6
INVENTOR
William F. Wolfner II
BY
ATTORNEY Patented Nov. 13, 1951

2,575,203

UNITED STATES PATENT OFFICE 2,575,203

FILM ADVANCING MECHANISM IN A SOUND-PICTURE STRIP PROJECTOR

William F. Wolfner, II, New York, N. Y., assignor, by mesne assignments, of twenty-five per cent to James O. Coit, Jr., and seventy-five per cent to Lawrence A. Wien Application February 14, 1947, Serial No. 728,427

16 Claims. (Cl. 88—28)

This invention relates to sound and picture controlling systems wherein recorded signals on sound track-carriers automatically control the operation of an associated projector which is arranged to show picture areas of a film related to the recorded matter on the sound record.

One object of this invention is to provide such a sound record and picture projection system in which appropriate signals are recorded in the sound track of the record at those locations of the sound record at which it is desired to change the picture framed in the projector.

Another object of this invention is to provide such a combination sound record and picture projector system in which the operating signals impressed upon the sound track of the record will be at a frequency above the normally reproduced audible frequency of the recorded matter on the record, with means provided to be selectively responsive to such higher frequency of the operating signal, and operative upon receipt of such signal to operate the projector in a desired manner, such as advancing the film strip only one frame to show a subsequent picture frame, or several frames in rapid sequence.

Another object of this invention is to provide a novel and highly efficient mechanism whereby a projector may be actuated to advance a single frame of a film strip.

A further object of the invention is to provide a projector actuating mechanism that shall operate with simple harmonic motion and thereby move a film strip without tearing, and eliminate or minimize vibration-producing forces during the operation of advancing a frame of the film in the projector.

Another object of the invention is to provide a control system wherein the automatic operation of the projector may be easily and quickly changed over to a semi-automatic manually controllable operation.

The manner in which the equipment and apparatus are constructed and arranged to operate in accordance with this invention is illustrated in the accompanying drawings, in which Fig. 1 is a schematic view of a combination sound record and picture projection system wherein a control signal recorded on the sound track of the record is utilized to operate the projector at a desired time to change from one frame showing of a film strip to a subsequent frame showing of the strip;

Fig. 6 is a simplified diagram of the electronic equipment of the system; and

Figure 1:
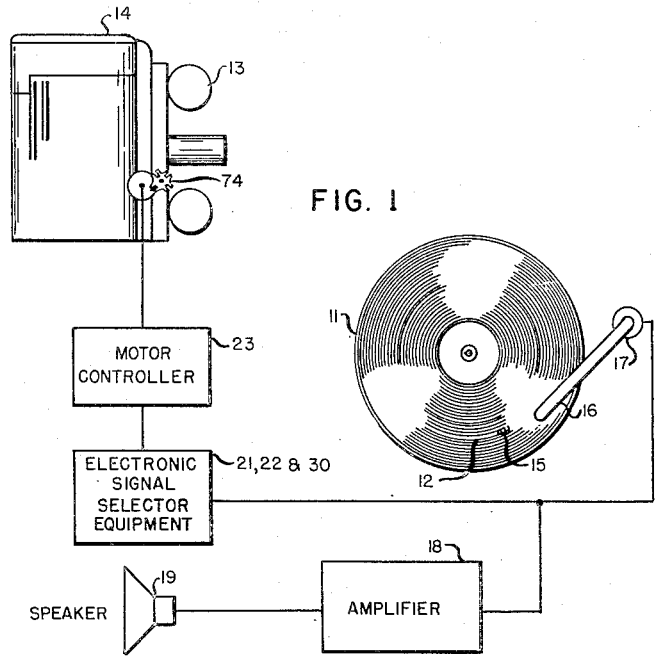

As is illustrated schematically in Fig. 1, a sound record carrier 11 of the disc type has recorded thereon a sound record or track 12, which for the purpose of the present explanation, has some relationship to pictures on a film strip 13 that are to be exhibited by an associated projector 14. The film strip 13 is to be advanced frame by frame, usually only one frame per operation, to exhibit the picture frame or frames to which reference is made by the corresponding passage in the sound track on the disc record.

Figure 2:
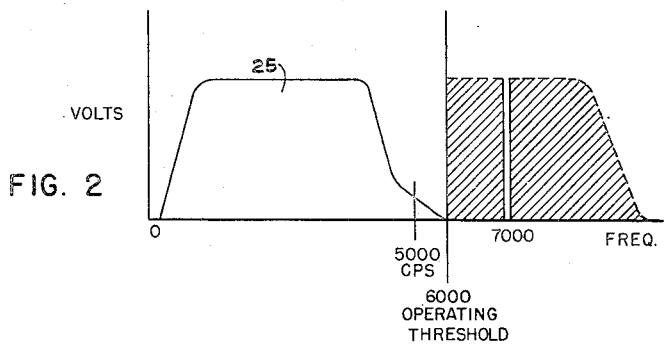
Fig. 2 is a graph of a derived electrical quantity, such as voltage, versus frequency, arranged to show the normal usable range of frequency within which usual good quality reproduction of sound recording occurs, and the range within which a control signal recording is disposed to provide a selective frequency signal to control an associated equipment, such as a projector, or a switching device.
Figure 3:
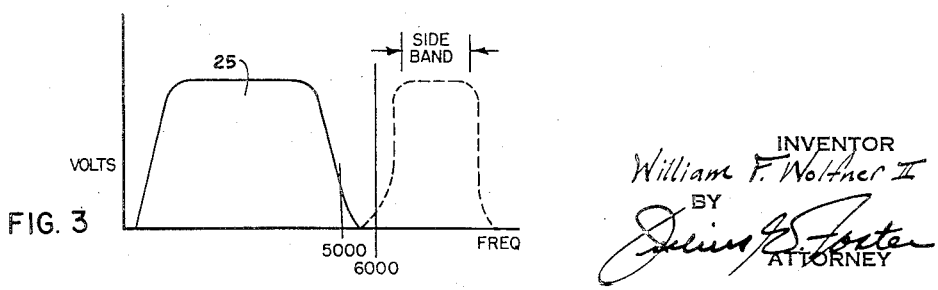
Fig. 3 is a similar graph of a frequency detection region wherein the sound record as originally made is suitably modulated to develop an upper side band of frequencies in the range to include a high frequency control signal desired to establish the control operation.
Figure 7:
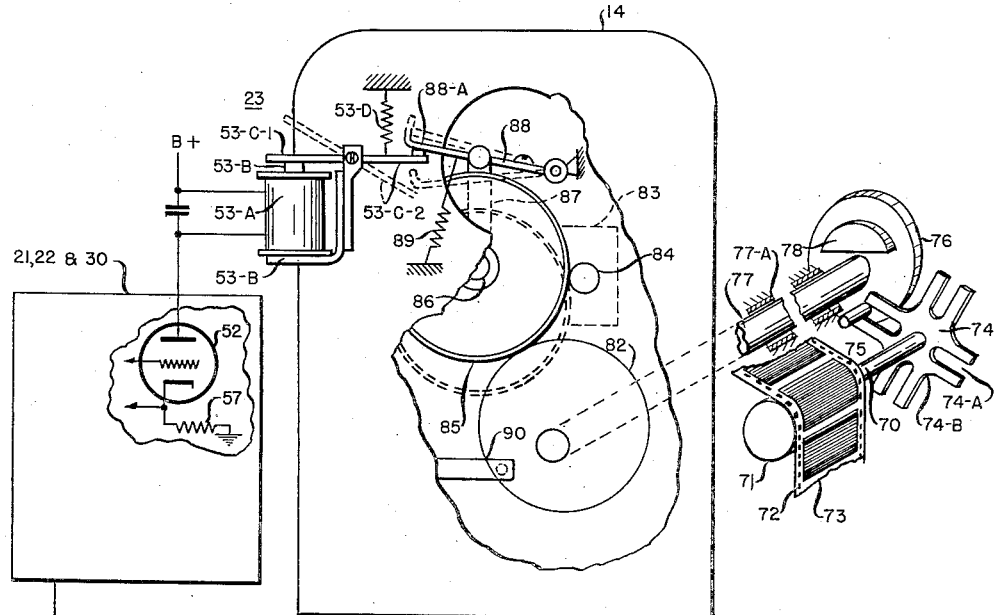
Fig. 7 is a simplified schematic diagram of the mechanical equipment at the projector, that is responsive to a control signal from the electronic equipment of Fig. 6.

In order to advance the film strip 13 at the appropriate time corresponding to the progress of the description or comment contained in the sound track 12, a suitable control signal is recorded in the sound track at a region indicated at 15, corresponding to the time when a change of frame in the film will be desired. The record disc 11 is arranged to be rotated on the usual turntable, and a suitable pickup, such as magnetic or crystal type, supported on a pivoted tone arm 17, provides an electric signal corresponding to the record in the sound track 12 or to the control signal 15.

Where the control signal is recorded at the end of a sound track and prior to the start of a subsequent passage, the control signal alone will be detected from the recording as a separate signal, similar to the arrangement indicated in Fig. 2. Where the control signal is superimposed on the recorded sound track near the end of the sound passage, as indicated in Fig. 3, the control signal will be selectively isolated by the electronic equipment. In either case, the control signal thus derived will be utilized for the desired control operation.

The record disc 11 is prepared in the usual manner, with the desired sound recording of speech or music along the track 12. Such recording will be within the normal usable part of the audibility range within which average good reproduction or broadcasting is made. The upper frequency limit of that range is about 5000 C. P. S. In order to provide a control signal that may be utilized to operate the projector automatically at the proper time, the control signal 15 is recorded at a frequency above such normal speech or music recording and reproduction range, and, for the purpose of the present application, the control frequency is utilized at about 7000 C. P. S., with a permissible operating threshold somewhat below 7000 C. P. S., for example, about 6000 C. P. S.

Figure 4:
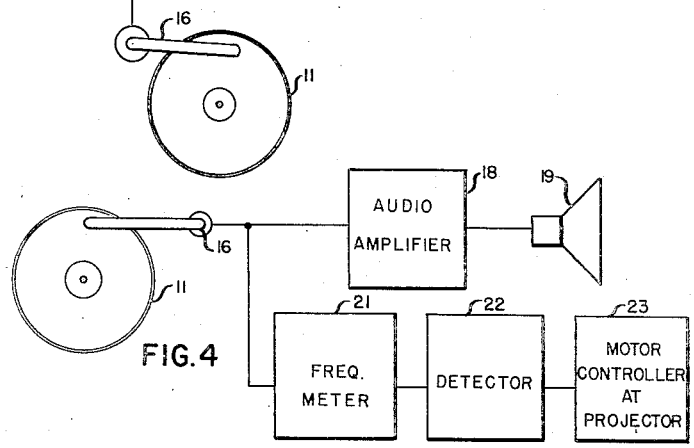
Fig. 4 illustrates in schematic block diagram the manner in which the control signal is isolated to control the operating motor at the projector.
Figure 5:
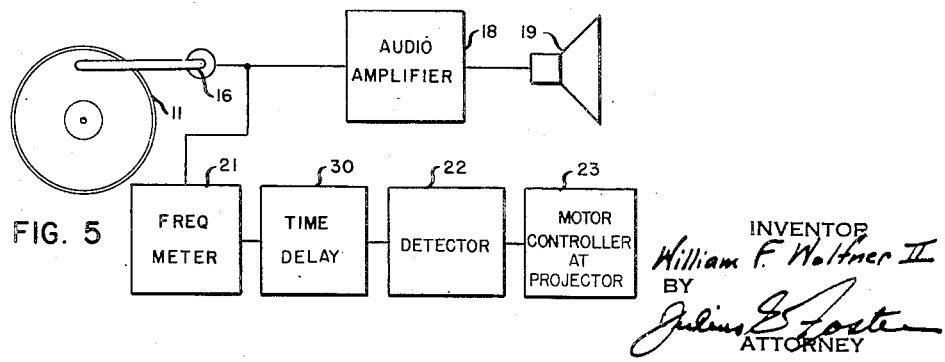
Fig. 5 is a block diagram similar to Fig. 4 with a time delay function introduced to guard against transients.

As indicated in Fig. 1 and diagrammatically in Figs. 4 and 5, the voltage derived from the pickup 16 is fed to two circuits. The first circuit includes an audio amplifier 18 which feeds into a loud speaker 19 to reproduce the sound that is recorded on the sound track 12.

The second circuit fed by the pickup includes a device that may be indicated generally as a frequency measuring device 21, which supplies an output voltage that is proportional to the frequency of the impressed signal. Such output voltage is supplied to a balancing or biased device such as a detector 22 that will select and transmit only those voltages which exceed a predetermined minimum value and which therefore correspond to a frequency equal to or in excess of the minimum frequency of the range of control frequencies. Such selected and transmitted voltages will correspond to control signals whose respective frequencies exceed the normally reproducible portion of the audible frequency range and will therefore correspond to the control frequency. False signals of high frequency developed as transients are guarded against in a manner that will be explained below. The output of the detector 22 is then utilized to control the operating means, which in this case is the magnet or relay 23, for controlling the operation of the projector 13 to advance the film strip one frame.

Fig. 2 is a graph of voltage versus frequency, and it shows generally an operating region 25 up to about 5000 C. P. S. containing the normal usable range of audibility that may be reproduced by a loud speaker from a record disc with what is commercially considered good quality. Beyond the range of 5000 C. P. S. the frequencies become more attenuated for sound reproduction purposes. At the frequency of 7000 C. P. S. is the general zone within which the control signal 15 is recorded, to be picked up and transmitted to the electronic equipment. Such high frequency control signal will ordinarily not be audibly reproduced by the loud speaker 19, or, at least, not enough to be noticeable or distracting, but particularly because of its relatively short duration, of the order of a quarter second. That signal will, however, be suitably amplified and detected and supplied to the control equipment of the projector to establish an actuating movement of the projector to advance the film strip through one or more frames according to the control to be exercised by the signal.

The control signal need not be set at a single frequency which would correspond to the frequency line of 7000 C. P. S., since the system is arranged to operate on any control signal whose frequency is in excess of a threshold frequency that may be taken to be the upper limit of the usual reproducible portion of the audible range. For example, as shown in Fig. 2, the frequency of 6000 C. P. S. may be taken as both the upper limit of satisfactory commercially reproducible audibility and as the threshold of the control frequency range. Thus any signal of a frequency above 6000 C. P. S. would suffice to function as a control signal to effect the desired operation of the projector.

The control signal will ordinarily be recorded at a frequency of 7000 C. P. S. However, by setting the operating threshold at 6000 C. P. S., a safety factor is maintained that will assure operation even down to a frequency of 6000 C. P. S., in the event that variations might result in the operation of the record and the associated equipment due to variations in line voltage, or temperatures, or due to other ambient conditions. Thus, even though the control signal be recorded at a frequency of 7000 C. P. S. but due to variations in the line voltage or the temperature of the operating equipment, or other operating conditions, the effective frequency would be less, nevertheless the selective equipment would still operate.

Another arrangement for disposing a control signal on the record is illustrated by the graphs in Fig. 3. As shown in Fig. 3, the normal sound recording within the audible range would be within the region or area 25 indicated up to the frequency of 5000 C. P. S. The operating or control signal could be superimposed on the sound recording, by modulating the recorded sound for a short time interval at the instant when such control operation would be desired. The duration of the control signal need be only about a quarter second. Such modulation by appropriate selection of the modulating frequency, would establish an upper side band of frequencies beyond the normal reproducible part of the audible range and extending beyond the operating threshold into the control signal region.

Because of the possibility that transient voltages of high frequency might be developed, due to needle scratch, for example, or other causes, which would be within the predetermined range of the control signal frequencies, a suitable safeguard is provided against false operation in response to such transient frequencies, by introducing a time delay function in the control operation. Such time delay insures a distinction between a transient high frequency signal and a proper control frequency signal since a transient signal is of relatively short duration in comparison with the control signal.

Time delay means 30 is disposed between the frequency metering element 21 and the detector element 22, to introduce the time delay function, as shown in block diagram in Fig. 5.

Proper operation of the final operating means 23 is thus assured by a signal whose frequency is within the predetermined control frequency range, and that exists for more than a minimum time interval, sufficient to outlast a transient signal of high frequency.

The general system shown in the block diagram of Fig. 5 is illustrated in more detail in Fig. 6. As is there shown, the pickup 16 generates a voltage corresponding to the recorded sound or signal record on the disc 11, and that voltage is fed into the audio amplifier 18 of suitable design and power to operate the power speaker 19. The voltage from the pickup is simultaneously fed into a series of cascaded amplifiers 35—1, 35—2 and 35—3, that serve as clippers to provide a square wave output 36 from an alternating voltage input 37 supplied by the pickup.

The square wave 36 is then fed to a differentiating circuit including a condenser 38 and a resistor 39. The condenser 38 is preferably adjustable to provide for adjustably predetermining the frequency of the operating threshold of the control frequency range. The square wave input fed into this differentiating circuit is converted into an output voltage of sharp pulses 40 of both polarities.

Adjustment of the condenser 38 determines the operating threshold of the system by controlling the frequency level at or beyond which the voltage received by the condenser will develop an adequate output voltage across the resistor 39, by reason of the time constant established by the condenser 38 and resistor 39.

The double polarity sharp voltage output pulses 40 from the resistor 39 are fed to the grid of a cathode follower tube 42 which serves to rectify the double wave input sharp pulses and provide single wave output sharp voltage pulses 43 of one polarity only.

The sharp voltage pulses 43 from the cathode follower are then fed to a timing or time delay circuit 30, including a resistor 45 and a condenser 46. An output voltage is derived across the condenser 46, that is a function of the original frequency of the voltage introduced into the clipping amplifiers from the pickup, and that is also a function of a time delay introduced by the C—R time constant of the timing circuit 30 including the resistor 45 and the condenser 46. Such time delay is introduced as the time required for the condenser 46 to be charged through the resistor 45 to a predetermined operating voltage, which is a measure of the duration of the voltage signal applied to the timing circuit. The control signal on the record is of sufficient duration to assure adequate charging of the condenser 46 to develop an adequate triggering voltage required to perform the ultimate operating function. A transient voltage would not be of sufficient duration to assure such adequate charging of the condenser. Consequently, the necessary value of the control voltage would not be achieved by a transient voltage signal. Generation of an adequate triggering voltage across condenser 46 is therefore an assurance that such triggering voltage corresponds to a proper control signal.

The triggering voltage is utilized to operate a flip-flop circuit utilizing a double triode combination 51 and 52, which may be disposed in one envelope. The triode 51 is provided with a load resistor 51—1 and the triode 52 has connected as its load, the coil 53 of a control magnet which is utilized to control the operation of the projector when a control signal is detected on the record. The winding of the control magnet 53 is bridged by a condenser 54. The plate of the first triode 51 is connected, in usual fashion, through a coupling condenser 51—2 to the grid of the second triode 52. The grid 52—g of the second triode 52 is connected to its cathode 52—2 through a timing resistor 52—3, whose function will be presently explained.

The cathodes of the two triodes 51 and 52 are joined, and connected to ground or to the negative terminal of the plate supply 56 through a common cathode resistor 57 and a bypassing condenser 57—1.

In order to provide for greater flexibility of operation, the system is also arranged to operate the projector to advance a film frame periodically at predetermined fixed time intervals, or to operate the projector semi-automatically at the will of an operator.

The timing control for establishing regularly recurring operation of the projector at fixed time intervals is provided by a timing circuit including a resistor 58—1 and a condenser 58—2 connected between the two joined cathodes and ground. When such operation is desired, the grid 51—g of triode 51 is disconnected from the time delay condenser 46 and connected to the junction point 58—3 between the resistor 58—1 and the condenser 58—2. A single pole double throw switch 59 is used for the switchover and back. Terminal 59—a of the manually operable switch 59 is connected to condenser 46 and the other terminal 59—b is connected to the junction point 58—3. The movable element of switch 59 is connected to grid 51—g, and is manually set to connect the grid to terminal 59—a for automatic operation by a control signal from the sound record, or to terminal 59—b for automatic periodic operation by the time control circuit 58.

In order to provide for the semi-automatic operation of the projector under the control of an operator, a simple push-button type switch 61 is connected through a suitable cable 62 to the sleeve terminal of a telephone switchboard type plug 63 which is adapted to be inserted into and withdrawn from a jack 64. The plug 63, when inserted into the jack 64 serves to open a jack switch 65, disconnecting the ground or negative circuit of the second clipper amplifier 35—2 from the negative or ground bus. The sleeve terminal of the plug is connected through a resistor 66 to the plate of triode 52. Resistor 66 is bridged by a condenser 66—1. When the push-button 61 is depressed to close the switch circuit, the plate circuit of the triode 52 is momentarily bypassed to de-energize the magnet coil 53—a with a consequence that will be better understood by consideration of the flip-flop circuit as it will now be described.

The operation of the flip-flop circuit is as follows; triode 52 is normally energized and its plate current through cathode resistor 57 puts enough bias on grid 51—g of triode 51 to keep triode 51 cut-off. The high plate voltage of the first triode 51 therefore normally keeps the voltage on grid 52—g at a level sufficient to maintain the second triode 52 normally conducting. The plate current of the second triode 52 keeps the electromagnet coil 53 normally energized.

When a control signal is detected on the record it is selectively transmitted through the electronic system to the output of the time delay circuit and then impressed as a pulse upon grid 51—g of first triode 51. Assuming that it is a proper control signal pulse, its amplitude will be sufficient to overcome the negative bias on the grid 51—g and will instantaneously raise the grid voltage sufficiently to render the triode 51 conducting. The plate voltage of first triode 51 will thereupon drop, depressing the voltage on grid 52—g in the second triode 52. Triode 52 will thereupon be cut-off and rendered non-conducting. The consequent drop in plate current through triode 52 will decrease the voltage drop across cathode resistor 57. The negative bias will thereupon be removed from grid 51–g, permitting faster operation of triode 51. The electromagnet coil 53–A will thereupon be quickly de-energized. The condenser 54 serves to stabilize the magnet operation by by-passing any voltage kicks generated by fluctuations of the power supply 56.

The function of the flip-flop circuit, of tubes 51 and 52, is to de-energize the electromagnet winding 53–A momentarily, upon receipt of a control signal pulse from the sound record.

After the voltage of the coupling condenser 51—2 is lowered by the rapid voltage drop of the plate of first triode 51, the coupling condenser 51—2 requires a certain amount of time to get rid of its negative charge. That time interval is governed by the time constants of the circuit including the condenser 51—2, the load resistor 51—1, resistor 52—3, and cathode resistor 57. The grid cathode resistor 52—3 is usually fixed after computation of the desired time constant of the condenser circuit which will control the duration of the time interval required for the condenser to lose its negative charge and reach a voltage at which its associated grid 52–g of the second triode can again become positive to or above cut-off value to render triode 52 again conducting to re-energize the electromagnet coil 53.

By that time the positive potential of the control pulse, whose application to the grid of triode 51 had initiated the flip-flop action, will have expired. The negative bias will be re-established on the grid of the first triode 51, through the cathode resistor 57, due to the re-established plate current through triode 52, and triode 51 will again be non-conducting. Triode 51 will remain non-conducting due to such negative bias until another control pulse is transmitted from the sound record, or from the timing or semi-automatic controls, to the triode 51, to make grid 51–g more positive than its cut-off value.

When triode 51 is renedered conducting by the signal pulse on its grid 51–g, the momentary conduction between grid 51–g and the cathode of triode 51 permits quick discharge of time delay condenser 46 and thus guards against double operation of triode 51 by a single control signal pulse.

The electromagnet winding 53–A is thus normally kept energized, and is momentarily de-energized by a control signal pulse from the sound record, or from the timing or semi-automatic controls, when the projector is to be operated.

The manner in which the timing circuit 58 controls the action may now be considered.

The manual switch 59 is normally in the upper position, at which the grid of triode 51 is connected to switch terminal 59–a, that is connected to output condenser 46 of the time delay circuit. When the manually operated switch 59 is moved to contact 59–b, the grid 51–g of triode 51 is connected to the junction 58—3 between the resistor 58—1 and the condenser 58—2. Just prior to such connection of the grid 51–g to the junction 58—3 of the control circuit, that grid was negatively biased to the extent of the bias established by the cathode resistor 57. Connection of the grid to junction 58—3 raises the grid potential to that of the top plate of condenser 58—2. The voltage across the timing circuit 58 will be the voltage across the cathode resistor 57. Condenser 58—2 will acquire a charge whose voltage will approach that drop across resistor 57, according to the time constant of the timing circuit 58. The polarity of the top condenser plate will be positive to ground and will therefore raise the potential of grid 51–g against the negative bias from cathode resistor 57. When the bias of grid 51–g reaches cut-off or more positive than cut-off value, triode 51 becomes conducting, and flip-flop operation occurs, cutting off triode 52 momentarily to de-energize the magnet 53. The action is thus similar to that when a positive control signal is fed to the grid 51–g from the output of the time delay circuit 45, 46. The flip-flop action cuts off tube 52 and de-energizes the magnet coil 53.

After a time interval controlled by condenser 51—2 as previously explained, triode 52 becomes conducting again, and the larger plate current through triode 52 re-establishes a greater drop across resistor 57. The bias on grid 51–g goes immediately more negative and cuts off triode 51 until condenser 58—2 can recharge enough from the increased voltage now available across resistor 57 to raise the potential on grid 51–g to or above cut-off value for the triode 51. The flip-flop action then repeats itself.

The time constant for the timing circuit 58 may be established by appropriate values of resistor 58—1 and condenser 58—2 in relation to the voltage drop that will be available across the cathode resistor 57 during normal conducting operation of triode 52. Resistor 58—1 is adjustable to permit varying the time constant of the circuit and thereby control the length of the time intervals between successive operations.

To re-establish automatic or semi-automatic operation, the switch 59 is restored to its upper position to connect the grid 51–g to contact 59–a.

For semi-automatic operation the remote control push-button switch 61 is employed as described above, to by-pass the triode 52 momentarily and de-energize the magnet 53–A.

In each case, whether automatic or semi-automatic, or timed periodic operation, the momentary de-energization of the electromagnet is sufficient to permit the projector operation to take place, after which the equipment is restored to ready position for another operation, if desired.

The manner in which the electromagnet 53 operates to control the projector when the electromagnet is de-energized and again re-energized by the flip-flop circuit may now be considered in connection with a brief description of the projector mechanism.

The function and purpose of the control signal is to operate a slide film projector 60 to cause the mechanism of the projector to advance a slide film one frame per operation in response to a unit control signal. Where more than one frame is to be advanced, an appropriate group or series of signals may be recorded on the record sound track, or established at the remote control push-button switch.

The projector itself may be operated manually to advance the film. For such operation, a manually operable knob is provided with the usual clutch mechanism for adjusting the relative angular position of the knob and its shaft with respect to the framing mechanism to control the proper position of a frame area on the film relative to the fixed projection frame area of the projector. That adjustable feature is standard in such projectors, and need not be described in detail here.

The automatic, timed, or semi-automatic operation of the projector is accomplished, however, in accordance with the system described herein, by an electric motor 61 acting through a driving connection which is momentarily established between the motor and the film-advancing mechanism of the projector to advance the film one frame.

The motor is normally rotating so that it may immediately deliver its energy to the projector when a control signal is flashed to the control magnet 53.

The mechanism of the projector for advancing the film will be considered first, and then the mechanism that is controlled by the control signal to establish the driving connection.

In operating the projector mechanism, to advance the film from an exhibited frame to a subsequent frame, a problem is involved in starting the mechanical parts from rest and accelerating them quickly to effect the advance of the film frame, and then decelerating the mechanism to rest again, all in quick action through a short time interval. Due to the inertia of the moving parts, even though they be made as light as possible, it is nevertheless quite a problem to effect such movement rapidly and at the same time relatively noiselessly. Such noiseless movement in advancing the film from frame to frame is particularly desirable in view of the fact that, since the sound on the disc record is being reproduced for an audience that is usually within hearing range of the projector, any noise caused in the operation of the mechanism of the projector would interfere with the desired audibility of the reproduction of the record. For that reason not only fast operation, but also quiet operation of the projector is desired.

Moreover, what is more important, gradual start and stop operations are necessary to prevent breaking of the film.

In the present system, the actuation of the projector mechanism is therefore effected through simple eccentric rotary motion which permits most satisfactory gradual starting from rest position, with maximum acceleration and gradual deceleration to rest position again.

In addition to providing such actuating movement of the projector mechanism with gradual start and gradually decelerated stop, it is also a feature of this invention to provide a mechanical clutching and declutching action at the beginning and at the end respectively of the simple eccentric rotary motion operation, in order that the source of driving power may be quickly connected to and quickly disconnected from the projector mechanism.

In order that no time may be lost in accelerating the motor from rest to an energy delivering condition, the motor is normally fully energized and rotating at normal operating speed. It is of appropriate construction and suitably mounted for quiet and noiseless operation so that its continuous operation will have no effect upon the sound reproduction from the associated disc record.

While a picture frame is at rest, however, the motor for the projector mechanism is mechanically disconnected from the film-advancing mechanism.

*The film advancing mechanism*

The film advancing mechanism of the projector may be considered in its simplest form, for the purpose of the present description, as a rotatable shaft 70 which carries two sprocket wheels 71 for engaging sprocket holes 72 in the film strip 73. One rotation of the shaft 70 is adapted to advance the film strip an exact whole number of frames. In the present case, one rotation of shaft 70 will advance the film strip four complete frames. Such rotation of the shaft 70 to advance the film strip is effected through a star-wheel, or Geneva wheel, 74 which is provided with four radial slots 74-a, and four locating sectors 74-b in the body section of the wheel 74 between the slots.

The Geneva wheel 74 is arranged to be operated by an eccentric pin 75 mounted on a disc plate 76 that is fixedly secured to one end of a power shaft through which driving energy from the electric motor of the projector is supplied to the eccentric pin to advance the Geneva wheel a quarter turn per operation.

After the Geneva wheel is turned through a quarter turn, it is then locked in such position against vibration, or casual displacement, by a locking segment 78 that is also fixedly mounted on the power shaft 77 adjacent to or as an integral part of and concentric with the disc plate 76. A section of the locking segment is removed to permit the eccentric pin 75 to move freely into and out of each slot 74-a in the Geneva wheel as the pin moves through its circular path to actuate the Geneva wheel with simple harmonic motion. Such simple eccentric rotary motion is achieved by reason of the fact that the eccentric pin enters each operating slot of the Geneva wheel at a position where the slot is substantially tangentially disposed with respect to the circular path of the eccentric pin.

The power shaft 77 is supported by a cylindrical tube provided with two spaced supporting elements 77-A, which are adapted to be secured to a supporting structure, or chassis, such as a carrying case in which the equipment is to be disposed.

The power receiving end of the power shaft 77 carries a cam disc 82 which is fixedly secured to that end of the shaft 77 and is adapted to serve as a driven element for receiving driving energy from a motor to drive the power shaft 77. The cam disc 82 is a circular disc that is eccentrically mounted with respect to the power shaft 77 in order to provide a desired cam action whereby it will help to control the disconnection of the motor drive from itself after making one rotation of the power shaft. Each such rotation of the power shaft rotates the disc plate 76 and the eccentric pin 75 through one rotation, and, during each such single rotation, the eccentric pin operates the Geneva wheel through a quarter turn so the next succeeding slot of the Geneva wheel will be in position to receive the eccentric pin at the beginning of the next rotation of that pin by the power shaft 77.

After the eccentric pin 75 leaves a slot 74-a, the locking segment 78 engages the locating sector behind that slot and prevents further rotation of the Geneva wheel.

The control magnet mechanism may now be considered which controls the application of the driving power to the cam disc 82 to advance the slide film.

*The control magnet mechanism*

The control magnet mechanism includes the magnet 53 whose energizing coil 53-a is shown in the diagram of Fig. 6 in the plate circuit of triode 52 of the flip-flop circuit. The control magnet comprises, in addition to the coil winding 53-a, a stationary core 53-b of magnetizable material and a pivoted armature 53-c of magnetizable material having a main portion 53-c-1 that is normally biassed by a spring 53-d to magnetic closed position in contact with the magnet core 53-b. The armature 53-c is also provided with a backward extension 53-c-2 which extends backward over the pivot support 53-e of the armature and serves as a lever arm by means of which the main portion 53-c-1 of the pivoted armature may be moved to magnetic open position, away from engagement with the magnet core 53-b.

The operation of the magnet 53 is such as to hold its armature in magnetic closed position so long as the armature engages the core when magnet coil 53-a is energized. But the armature may be moved to magnetic open position by an external element against the force of the armature biassing spring 53-d, when the magnet coil 53-a is de-energized to or below the critical holding value necessary to prevent the external element from moving the armature away from its associated magnetic core. The magnet is not strong enough, however, to restore the armature to magnetic closed position against the external forces of the associated mechanism. The armature must be mechanically restored to magnetic closed position by the associated mechanism before the holding effect of the magnet coil may be made effective.

The function of the control magnet 53 is to release the idler pulley to permit the motor drive connection to be established from the electric motor to the cam disc 82 when the electromagnet coil 53-a is de-energized, as explained in the description of the operation of the flip-flop circuit. So long as the magnet coil 53-a is energized, however, while the armature 53-c-1 engages the core 53-b, the back extension 53-c-2 of the armature is in such position as to prevent or restrain a driving connection from being made between the drive motor and the cam disc 82. The construction of the drive establishing element may now be considered.

The drive motor 83 is provided with a pinion element 84, from which the driving connection to the cam disc 82 is established, at desired times, by a floating idler pulley 85. The idler pulley is rotatably supported on a pin 86 which is anchored in a movable support 87 which is disposed on a pivoted bracket 88 so that oscillating movement of the pivoted bracket will reciprocate the idler pulley support to move the idler pulley as a clutch into and out of engagement between the motor pinion and the cam disc 82. The pulley normally engages the motor pinion 84, but not cam disc 82.

A biassing spring 89, having one end anchored on the frame, or chassis, is connected at its operating end to the pulley support in such manner as to bias the driving idler pulley towards engagement with the cam disc 82. Normally, however, the bracket 88 and the pulley 85 with its support 87 are held in restrained or retracted position by the magnet armature extension 53-c-2 blocking an extension arm 88-a on the bracket 88 against moving in response to the biassing spring 89. The idler pulley is thus held disengaged from the cam disc, and transfer of driving energy from the motor to the cam disc is thereby prevented. Consequently, when the electromagnet coil 53-a is de-energized by the action of the flip-flop circuit, the biassing spring 89 connected to the pivoted bracket 88 will overcome the lighter biassing spring 53-d of the magnet armature. The pivoted bracket 88 will thereupon move through its permitted limited arcuate path with its restraining arm 88-a pressing downward on the backward extension 53-c-2 of the armature. The bracket 88 will thereupon move the armature 53-c-1 away from its core to magnetic open position, and at the same time the idler pulley will be moved to engagement with the cam disc 82, to establish a power drive connection between the motor and the cam disc.

Driving energy from the motor through the idler pulley will be imparted to the cam disc instantly, and as the point of engagement between the idler pulley and the cam disc approaches the smallest radius of the cam, the idler pulley will be permitted to move through a sufficient distance to enable the restraining arm of the pivoted bracket 88 to disengage the magnet armature 53-c-1 further from its closed magnetic position against the core. The magnet armature will then be held away from its core until the associated mechanism restores the armature to magnetic closing position even though the magnet coil will have been reenergized immediately after the armature was moved out of contact with the core. The idler pulley therefore remains in contact with the cam until the cam completes one cycle of operations. During that cycle, the cam disc receives driving power from the motor through the idler pulley to rotate the power shaft 77 and the eccentric pin 75 to move the Geneva wheel through a quarter turn, and as the cam disc rotates through one rotation, the large radius of the cam moves the idler pulley backward with its support, and the pivoted bracket 88 and the restraining arm 88-a to move clear of and to disengage the magnet armature 53-c-2. Thereupon the magnet armature 53-c-1 is restored to its magnetic closed position at core 53-b by its biasing spring 53-d, and, as the idler pulley continues to rotate, the cam disc 82 moves a shorter radius into engagement with the pulley, thereby permitting the pulley with its support and pivoted bracket again to move in a forward direction for a short distance. Such movement is arrested, however, when the restraining arm 88-a of the pivoted bracket 88 engages the magnet armature 53-c-2 which will now be firmly held in magnet closed position by reason of the fact that the magnet coil 53 will have been re-energized after the momentary de-energization by the action of the flip-flop circuit. The idler pulley will thus be disengaged by the rotating cam disc and the driving connection between the motor and the cam disc will thus be broken without any sudden force application and without any jarring action on the equipment.

The cam disc and its power shaft leading to the Geneva wheel will still retain a small amount of kinetic energy but the forward movement will be substantially immediately arrested by a spring biassed friction shoe 90 acting against a surface of the cam disc 82.

By means of the arrangement described, the projector mechanism is operated to rotate the power shaft through one rotation, which serves to advance the Geneva wheel through one step operation to advance the slide film only one frame. By means of the apparatus shown, the slide film is thus controlled to advance only one frame per operation in response to a single control signal. Of course where the operation of the projector may be desired to advance the film through several frames in quick succession to present an animated action in the film, the control signals may be appropriately disposed in the record to provide such multiple stepping action of the film advancing mechanism.

While the control system has been illustrated as applied to the operation of a slide film projector, it will be clear that the system may be similarly applied to the control of a switching device, such as a stepping switch employed in automatic telephony, or a commutator type switch in which a plurality of circuits may be sequentially energized.

Also, although I have shown a disc type sound record carrier, it should be clear that my invention may be equally well applied to other sound carriers, such as film, or magnetic recording wire, so long as the carrier will receive and retain a high frequency signal beyond the normal usable audible range, which I have indicated by way of example as being 5000 C. P. S. on a record of the disc type.

It will be clear, of course, that the location of the threshold of the control frequency range may be located as desired beyond the normal usable and audibly reproducible range utilized for audible sound reproduction.

Thus by utilizing a control signal located in a range of the frequency spectrum beyond the limit of the normal usable part of the audible range, and then introducing a time delay before that signal may become effective, a distinction is made between the control signal that is desired and a possible transient impulse that might be introduced into the circuit by external ambient conditions.

My invention is not limited to any of the specific details of construction or arrangements of mechanical parts or circuit elements shown, since those may be variously modified without departing from the spirit and scope of the invention as set forth in the appended claims.

I claim:

1. A film strip sound and projector system comprising a sound record carrier having a sound record track thereon, and control signals recorded at selected locations on the sound track; a projector for a film strip having mechanism for framing picture areas of the film and for advancing the film; and means responsive to a control signal from the record carrier for operating the projector to advance the film one frame, said means comprising a constantly rotating motor, and a power transmission operative to transmit power from said motor to said film-advancing mechanism, said transmission including an eccentric cam as a driving friction device for coupling and decoupling the motor and the mechanism.

2. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; and means responsive to a control signal from the record carrier for operating the projector to advance the film one frame, said means comprising a constantly rotating motor, and a power transmission operative to transmit power from said motor to said film-advancing mechanism, said transmission including an eccentric cam as a driving friction device for coupling and decoupling the motor and the mechanism.

3. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; and means responsive to a control signal for coupling the motor to the projector mechanism for sufficient time to cause the mechanism to advance the film one frame, said coupling means comprising a frictional power transmission of non-uniform speed including an eccentric cam.

4. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; a drive pulley for the projector mechanism; and means responsive to a control signal for coupling the motor to the drive pulley for the projector mechanism for sufficient time to cause the mechanism to advance the film one frame, said coupling means comprising a frictional power transmission of non-uniform speed including an eccentric cam.

5. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; and means responsive to a control signal for coupling the motor to the projector mechanism for sufficient time to cause the mechanism to advance the film one frame, said means including an eccentric cam as a frictional power-transmitting and clutching means resspponsive to a selected cyclic operation of the projector mechanism.

6. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; and means responsive to a control signal for coupling the motor to the projector mechanism for sufficient time to cause the mechanism to advance the film one frame; and an eccentric cam to constitute a frictionally operative drive means responsive to a selected cyclic operation of the projector mechanism for decoupling the motor and the projector mechanism.

7. A film strip sound and projector system comprising a sound record carrier having a sound record track thereon, and control signals recorded at selected locations on the sound track; a projector for a film strip having mechanism for framing picture areas of the film and for advancing the film; a motor for operating the projector mechanism; a drive pulley for the projector mechanism; and means including an eccentric cam responsive to a control signal for frictionally coupling the motor to the projector mechanism through said drive pulley for sufficient time to cause the mechanism to advance the film one frame; and means responsive to a selected cyclic operation of the projector mechanism for decoupling the motor and the projector mechanism at said drive pulley.

8. A film strip sound and projector system comprising a sound record carrier having a sound record track thereon, and control signals recorded at selected locations on the sound record; means for isolating the control signals from the sound record; a projector for a film strip having mechanism for framing picture areas of the film and for advancing the film; a motor for operating the projector mechanism; a drive member for the projector mechanism; and means responsive to a control signal for initiating and terminating a predetermined cyclic operation of the projector mechanism by coupling and uncoupling the motor and the drive member, said coupling means comprising a frictional power transmission of non-uniform speed including an eccentric cam.

9. A film strip sound and projector system comprising a sound record carrier having a sound record track thereon, and control signals recorded at selected locations on the sound record; means for isolating the control signals from the sound record; a projector for a film strip having mechanism for framing picture areas of the film and for advancing the film; a motor for operating the projector mechanism; a drive member for the projector mechanism; means responsive to a cyclic operation of the projector; and means responsive to a control signal and including an eccentric cam as a frictional engaging drive member for initiating a predetermined operation of the projector mechanism by coupling the motor to the drive member, and for then cooperating with the cyclic responsive means for terminating said operation of the projector mechanism by uncoupling the motor and the drive member.

10. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; and means responsive to a control signal and including an eccentric cam as a frictional engaging drive member for coupling the motor to the projector mechanism for sufficient time to cause the mechanism, said coupling means then operating independently of the signal duration, to advance the film one frame, and for then uncoupling the motor from the projector mechanism.

11. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; a drive member for the projector mechanism; an operating cam for said drive member, the cam being circular and eccentric on its shaft and operative to actuate the drive member with slow start and stop and fast intermediate movements; and means responsive to a control signal for operatively coupling the motor to the cam to cause one rotation of the cam to thereby operate the drive member to advance the film one frame.

12. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; a drive member for the projector mechanism; an operating cam for said drive member, the cam being circular and eccentric on its shaft and operative to actuate the drive member with slow start and stop and fast intermediate movements; and means responsive to a control signal for operatively coupling the motor to the cam to cause one rotation of the cam, and for then decoupling the motor and the cam.

13. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; a drive member for the projector mechanism; an operating cam for said drive member, the cam being operative to actuate the drive member with slow start and stop and fast intermediate movement; a floating idler pulley; and means responsive to a control signal for shifting the idler pulley for operatively coupling the motor to the cam through said idler pulley to cause one rotation of the cam.

14. A film strip sound and projector system comprising a sound record carrier having a sound record track thereon, and control signals recorded at selected locations on the sound tack; means for isolating the control signals from the sound record; a projector for a film strip having mechanism for framing picture areas of the film and for advancing the film; a motor for operating the projector mechanism; a drive member for the projector mechanism; an operating cam for said drive member; a floating idler pulley; spring means biassing the pulley toward operative position where the pulley may couple the motor to the cam; a restraining arm to hold the pulley in uncoupling position; and electromagnetic means normally holding the restraining arm to hold the pulley at said uncoupling position, said arm holding means being operative, upon receipt of a control signal to release the restraining arm to thereby permit the biassed idler pulley to move to operative position to couple the motor to the cam, and said holding means being subsequently operative to re-establish a hold on the restraining arm and thereby hold the idler pulley to decouple the motor and the cam after the cam has affected one cyclic operation of the projector mechanism, the operation of the cam serving to move the restraining arm back to a position where it can be held by the electromagnetic holding means.

15. A film strip sound and projector system comprising a sound record carrier having a sound record track thereon, and control signals recorded at selected locations on the sound track; means for isolating the control signals from the sound record; a projector for a film strip having mechanism for framing picture areas of the film and for advancing the film; a motor for operating the projector mechanism; a drive member for the projector mechanism; an operating cam for said drive member, the cam being operative to function with relatively simple harmonic motion; a floating idler pulley; spring means biassing the pulley to couple the motor to the cam; a restraining arm to hold the pulley in uncoupled position; and an electromagnet having a pivoted armature with an extension thereof in the path of movement of the restraining arm, whereby the arm is held in pulley-uncoupling position while the armature is in its attracted position and is permitted to move with the pulley in response to the biassing means when the armature is magnetically released from its attracted position, so the idler pulley may be moved by its biassing spring to couple the motor to the cam when the magnet armature is released.

16. A combination vision and sound system, comprising a sound record carrier having thereon a sound record of audible frequency and a signal record above normal audible frequency; a picture projector; a pick-up responsive to the sound record and to the signal record, and operative to generate an alternating voltage; amplifier means adjusted to operate as voltage clippers; means for converting the clipped alternating voltage output to square wave pulses; a differentiating circuit including a variable condenser and a resistor for converting the square wave pulses to sharp pulses and for transmitting only those above a selected frequency; a polarity selective circuit for transmitting only the sharp pulses of a selected polarity; a time delay circuit including an R—C combination having a selected minimum time constant and operative to supply an output voltage having an amplitude that is a function of the frequency of the received pulse; a picture projector having a framing mechanism including an operating shaft, a film-advancing member, a Geneva wheel for controlling the rest position of the framing mechanism, and means for operating the framing mechanism through said Geneva wheel; a motor having a drive pinion; a cam disk operative to rotate the operating means for the framing mechanism; an idler pulley movable into and out of engagement between the motor pinion and the cam disk, and a movable support for the pulley; means biassing the idler pulley support to move the idler pulley into engagement between the motor pinion and the cam disk; a restraining arm on the movable support for the pulley to hold the pulley out of such engagement; an electromagnet comprising a winding, a magnetic core, and a pivoted movable armature having an extension arm movable with the armature in the path of the restraining arm; said armature being operative, when held by the core, to hold the retracting arm in pulley-disengaging position, but said armature acting and being, operative when insufficiently energized, however, to release the restraining arm to permit that arm to move with the idler pulley support to forward drive-engaging position between the motor pinion and the cam; means responsive to the output voltage of the time delay circuit for controlling the magnet in such manner as to release the armature to permit the restraining arm to release the idler pulley to the pulley-biassing force to permit engagement to be effected between the motor pinion and the cam disk; the cam disk due to its eccentricity being operative after one rotation to move the idler pulley back to retracted position to enable the magnet armature to engage its core and be held to hold the pulley-restraining arm if the magnet is adequately re-energized at that time.

WILLIAM F. WOLFNER, II.

REFERENCES CITED

The following references are of record in the file of this patent:

UNITED STATES PATENTS

| Number | Name | Date |
| --- | --- | --- |
| 1,480,864 | Reed | Jan. 15, 1924 |
| 1,655,299 | Thornton | Jan. 3, 1928 |
| 1,658,361 | Tessier | Feb. 7, 1928 |
| 1,771,509 | Ott | July 29, 1930 |
| 1,909,765 | Jenkins et al. | May 16, 1933 |
| 1,987,544 | Wood et al. | Jan. 8, 1935 |
| 2,046,572 | Merta | July 7, 1936 |
| 2,050,059 | Koch | Aug. 4, 1936 |
| 2,116,314 | Jenkins et al. | May 3, 1938 |
| 2,136,209 | Finch | Nov. 8, 1938 |
| 2,141,203 | Abbott | Dec. 27, 1938 |
| 2,281,943 | Loughner et al. | May 5, 1942 |
| 2,313,001 | Chedister | Mar. 2, 1943 |
| 2,346,905 | Chedister | Apr. 18, 1944 |
| 2,405,237 | Ruhlig | Apr. 6, 1946 |
| 2,411,598 | Smith | Nov. 26, 1946 |